(12) United States Patent
Szczerba et al.

(10) Patent No.: US 9,008,904 B2
(45) Date of Patent: Apr. 14, 2015

(54) GRAPHICAL VEHICLE COMMAND SYSTEM FOR AUTONOMOUS VEHICLES ON FULL WINDSHIELD HEAD-UP DISPLAY

(75) Inventors: Joseph F. Szczerba, Grand Blanc, MI (US); Thomas A. Seder, Northville, MI (US); Dehua Cui, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 718 days.

(21) Appl. No.: 12/981,602

(22) Filed: Dec. 30, 2010

(65) Prior Publication Data

US 2012/0173067 A1 Jul. 5, 2012

(51) Int. Cl.
*G02B 27/01* (2006.01)
*G06F 3/041* (2006.01)
*B60K 35/00* (2006.01)

(52) U.S. Cl.
CPC .............. *G02B 27/01* (2013.01); *G06F 3/041* (2013.01); *G06F 3/0412* (2013.01); *G02B 2027/014* (2013.01); *G02B 2027/0187* (2013.01); *B60K 35/00* (2013.01); *B60K 2350/1012* (2013.01); *B60K 2350/2052* (2013.01)

(58) Field of Classification Search
USPC .................. 701/36, 300, 49; 345/7; 340/691.6
See application file for complete search history.

(56) References Cited

U.S. PATENT DOCUMENTS

| | | | |
|---|---|---|---|
| 6,986,581 B2 | 1/2006 | Sun et al. | |
| 7,090,355 B2 | 8/2006 | Liu et al. | |
| 7,182,467 B2 | 2/2007 | Liu et al. | |
| 7,213,923 B2 | 5/2007 | Liu et al. | |
| 7,460,951 B2 | 12/2008 | Altan et al. | |
| 8,098,170 B1 | 1/2012 | Szczerba et al. | |
| 8,098,171 B1 | 1/2012 | Szczerba et al. | |
| 8,354,997 B2 * | 1/2013 | Boillot ......................... 345/158 |
| 2005/0273218 A1 * | 12/2005 | Breed et al. ...................... 701/2 |
| 2007/0057781 A1 * | 3/2007 | Breed ........................ 340/457.1 |
| 2008/0158510 A1 | 7/2008 | Tant et al. | |
| 2008/0240502 A1 * | 10/2008 | Freedman et al. ............ 382/103 |
| 2009/0268946 A1 | 10/2009 | Zhang et al. | |
| 2010/0253489 A1 | 10/2010 | Cui et al. | |
| 2010/0253492 A1 | 10/2010 | Seder et al. | |
| 2010/0253493 A1 | 10/2010 | Szczerba et al. | |
| 2010/0253526 A1 | 10/2010 | Szczerba et al. | |
| 2010/0253539 A1 | 10/2010 | Seder et al. | |
| 2010/0253540 A1 | 10/2010 | Seder et al. | |

(Continued)

FOREIGN PATENT DOCUMENTS

CN 101046390 A * 10/2007

OTHER PUBLICATIONS

Press Release, "Techwell Announces TW8810 In-Car LCD Display Processor for Sharp Dual Directional Viewing LCD Panels", Jan. 8, 2007, http://www.thefreelibrary.com/Techwell+Announces+TW8810+In-Car+LCD+Display+Processor+for+Sharp+Dual...-a0157053165.*

(Continued)

*Primary Examiner* — Adam Tissot

(57) ABSTRACT

A method to control operation of a vehicle based upon a user input from a user of the vehicle to a graphic projection display representing a registered graphic to a view in front of the vehicle includes projecting the registered graphic to the view in front of the vehicle upon the graphic projection display, monitoring the user input to the graphic projection display, and controlling the operation of the vehicle based upon the user input to the graphic projection display.

19 Claims, 5 Drawing Sheets

(56) References Cited

U.S. PATENT DOCUMENTS

| | | |
|---|---|---|
| 2010/0253541 A1 | 10/2010 | Seder et al. |
| 2010/0253542 A1 | 10/2010 | Seder et al. |
| 2010/0253543 A1 | 10/2010 | Szczerba et al. |
| 2010/0253593 A1 | 10/2010 | Seder et al. |
| 2010/0253594 A1 | 10/2010 | Szczerba et al. |
| 2010/0253595 A1 | 10/2010 | Szczerba et al. |
| 2010/0253596 A1 | 10/2010 | Szczerba et al. |
| 2010/0253597 A1 | 10/2010 | Seder et al. |
| 2010/0253598 A1 | 10/2010 | Szczerba et al. |
| 2010/0253599 A1 | 10/2010 | Szczerba et al. |
| 2010/0253600 A1 | 10/2010 | Seder et al. |
| 2010/0253601 A1 | 10/2010 | Seder et al. |
| 2010/0253602 A1 | 10/2010 | Szczerba et al. |
| 2010/0253688 A1 | 10/2010 | Cui et al. |
| 2010/0253918 A1 | 10/2010 | Seder et al. |
| 2010/0254019 A1 | 10/2010 | Cui et al. |
| 2010/0289632 A1 | 11/2010 | Seder et al. |
| 2010/0292886 A1 | 11/2010 | Szczerba et al. |
| 2012/0089273 A1 | 4/2012 | Seder et al. |
| 2012/0093357 A1 | 4/2012 | Seder et al. |
| 2012/0169513 A1 | 7/2012 | Szczerba et al. |
| 2012/0169572 A1 | 7/2012 | Seder et al. |
| 2012/0169861 A1 | 7/2012 | Szczerba et al. |
| 2012/0173069 A1 | 7/2012 | Tsimhoni et al. |
| 2012/0174004 A1 | 7/2012 | Seder et al. |

OTHER PUBLICATIONS

U.S. Appl. No. 12/467,340, Szczerba et al.
U.S. Appl. No. 12/467,350, Seder et al.
U.S. Appl. No. 12/900,566, Szczerba et al.
U.S. Appl. No. 12/903,267, Seder et al.
U.S. Appl. No. 12/900,539, Seder et al.
U.S. Appl. No. 12/980,503, Szczerba et al.
U.S. Appl. No. 12/979,432, Szczerba et al.
U.S. Appl. No. 12/980,522, Seder et al.
U.S. Appl. No. 12/980,612, Szczerba et al.
U.S. Appl. No. 12/981,206, Tsimhoni et al.
U.S. Appl. No. 12/982,478, Seder et al.

\* cited by examiner

GRAPHICAL VEHICLE COMMAND SYSTEM FOR AUTONOMOUS VEHICLES ON FULL WINDSHIELD HEAD-UP DISPLAY

TECHNICAL FIELD

This disclosure is related to user input coordinated with a graphic display device.

BACKGROUND

The statements in this section merely provide background information related to the present disclosure and may not constitute prior art.

Presentation of information to the operator of a vehicle in an effective manner is desirable and reduces strain upon the operator. Head-up displays project light upon a screen and the light is converted into a viewable representation upon the screen. Head-up displays are known to present information to the operator of the vehicle in an effective manner by reducing strain upon the operator while allowing the operator to remain focused on driving.

Vehicle systems utilizing driving aids such as adaptive cruise control (ACC), automatic lateral control, collision avoidance or preparation systems, and lane keeping aids monitor and process information regarding the operating environment surrounding the vehicle. Information is available from a variety of sources to locate the vehicle in relation to a 3D map database, plan a travel route for the vehicle to a destination, and correlate this travel route to available information regarding the route. On-board vehicle systems provide a wide variety of information that can be used to improve control of the vehicle. vehicle to vehicle communications are known to utilize data collected in one vehicle in communicating with vehicles elsewhere on the road. Infrared sensors are known to detect features in a view based upon difference in infrared light emissions.

Input from a vehicle operator or occupant can be monitored or received from a number of sources. Buttons, levers, steering wheels, pedals, and other similar input devices permit a person to input control settings to a vehicle. Inputs to a graphical device, such as a touch screen display, are known.

SUMMARY

A method to control operation of a vehicle based upon a user input from a user of the vehicle to a graphic projection display representing a registered graphic to a view in front of the vehicle includes projecting the registered graphic to the view in front of the vehicle upon the graphic projection display, monitoring the user input to the graphic projection display, and controlling the operation of the vehicle based upon the user input to the graphic projection display.

BRIEF DESCRIPTION OF THE DRAWINGS

One or more embodiments will now be described, by way of example, with reference to the accompanying drawings, in which.

DETAILED DESCRIPTION

Figure 1:
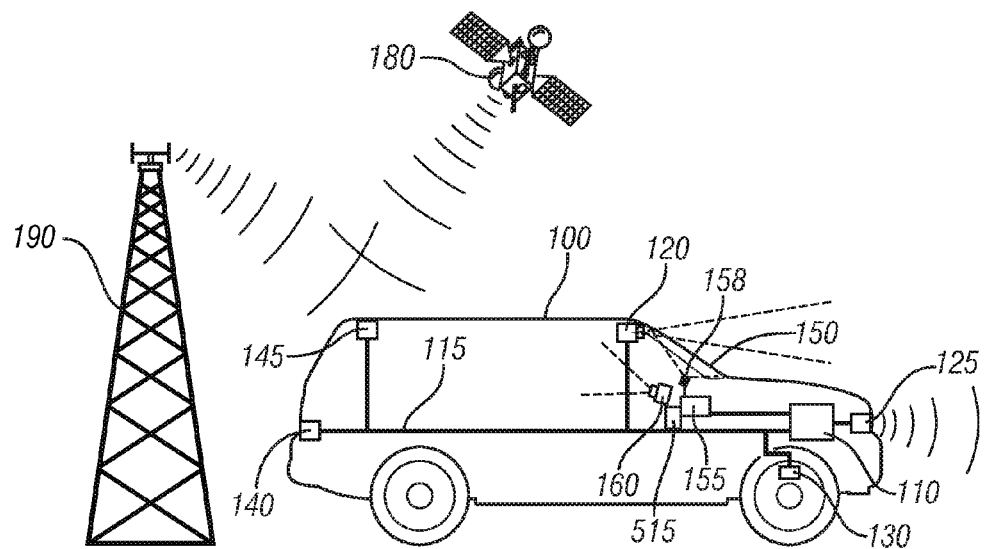
FIG. 1 illustrates an exemplary vehicle equipped with an enhanced vision system, in accordance with the present disclosure.

Referring now to the drawings, wherein the showings are for the purpose of illustrating certain exemplary embodiments only and not for the purpose of limiting the same, FIG. 1 illustrates an exemplary vehicle equipped with an enhanced vision system. An exemplary EVS system is disclosed in Co-pending U.S. application Ser. No. 12/417,077, which is incorporated by reference. Exemplary vehicle 100 includes an EVS system manager 110, a user input module (UIM) 515, vehicle sensor systems (including camera system 120 and radar system 125), vehicle operation sensors (including vehicle speed sensor 130), information systems (including GPS device 140 and wireless communication system 145); head-up display (HUD) 150, EVS graphics system 155, graphics projection system 158, and occupant eye location sensing system 160. The EVS system manager 110 can communicate directly with various systems and components, or the EVS system manager can alternatively or additionally communicate over a LAN/CAN system 115. EVS system manager 110 is communicates with EVS graphics system 155 in order to project graphics upon HUD 150. However, EVS system manager 110 can communicate with EVS graphics system 155 to instead or additionally project graphics upon other surfaces within the vehicle to accomplish methods herein. Discussed in further detail with reference to FIG. 4, the UIM 515 can receive user inputs indicated to a portion of a display device, wherein the user inputs are monitored by the EVS system manager 110. Camera system 120 includes a camera or image capturing device taking periodic or sequential images representing a view from the vehicle. Radar system 125 includes a device known in the art utilizing electromagnetic radiation to detect other vehicles or objects located near the vehicle. A number of known in-vehicle sensors are widely used within a vehicle to monitor vehicle speed, engine speed, wheel slip, and other parameters descriptive of the operation of the vehicle. Vehicle speed sensor 130 represents one such in-vehicle sensor, but the scope of the disclosure includes any such sensors for use by the EVS. GPS device 140 and wireless communication system 145 communicate with resources outside of the vehicle, for example, satellite system 180 and cellular communications tower 190. GPS device 140 may be utilized in conjunction with a 3D map database including detailed information relating to a global coordinate received by the GPS device 140 regarding the current location of the vehicle. Information from the vehicle sensor systems and the vehicle operation sensors can be utilized by the EVS system manager 110 to monitor the current orientation of the vehicle. HUD 150 includes a windscreen equipped with features capable of displaying an image projected thereupon while remaining transparent or substantially transparent such that occupants of the vehicle can clearly observe outside of the vehicle through the windscreen. HUD 150 can include a portion of the windscreen, for example, a portion including the driver side half of the windscreen, or HUD 150 can include substantially the full windscreen. One will appreciate that while HUD 150 includes the windscreen in the front of the vehicle, other surfaces within the vehicle could be used for projection, including side windows and a rear window. Additionally, the view on the front windscreen could be continued upon the front vehicle "A-pillars" and onto the side windows as a continuous image. EVS graphics engine 155 includes display software or programming translating requests to display information from the EVS system manager 110 in graphical representations of the information. The EVS graphics engine 155 includes programming to compensate for the curved and tilted surface of the windscreen and any other surfaces (e.g., non-transparent component 280 shown in FIG. 2) onto which graphics are to be projected. EVS graphics engine 155 controls graphics projection system 158 including a laser or projector device producing an excitation light to project the graphical representations. Exemplary occupant eye location sensing system 160 includes sensors known in the art to approximate a location of the head of an occupant and further the orientation or gaze location of the eyes of the occupant. Based upon the output of the occupant eye location sensing system 160, the current location and orientation of the vehicle 100 and a user input location, EVS system manager 110 can accurately dynamically register the graphical representations to the HUD 150 such that the occupant sees the images overlaid with visual images through the windscreen. Dynamic registration of graphics will be discussed in greater detail with reference to FIG. 5.

Figure 2:
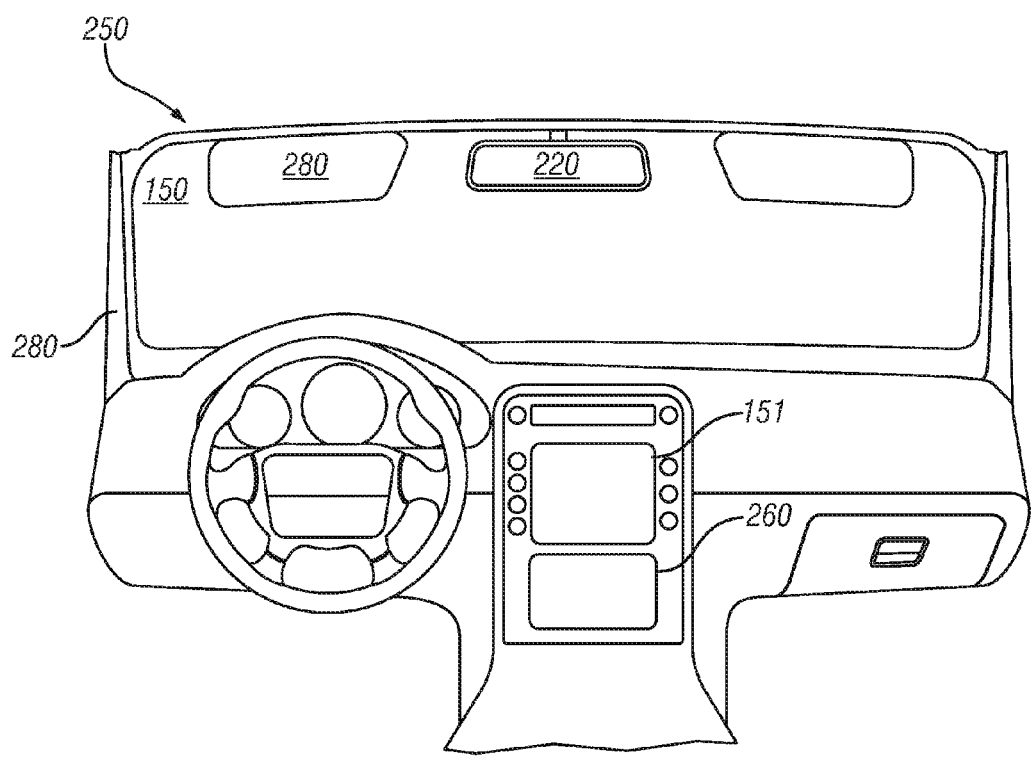
FIG. 2 illustrates exemplary embodiments of the graphic projection display, in accordance with the present disclosure.

Information can be presented to a user of a vehicle according to a number of exemplary embodiments. A number of video devices can be utilized to present information to the user. However, presenting the information within a context for the user of a view of the operation environment of the vehicle reduces visual complexity for control of the vehicle. A graphic projection display can be used to display graphics in the context of a view in front of the vehicle. A graphic projection display 250 and the associated graphics can be utilized according to a number of exemplary embodiments. FIG. 2 illustrates exemplary embodiments of the graphic projection display including a substantially transparent windscreen HUD 150, a touch screen display 260, a human machine interface (HMI) 151 including a display, non-transparent components 280 and a display monitor 270 mounted within the interior of the vehicle. It will be understood that any of the depicted embodiments included with the graphic projection display 250 can project graphics corresponding to and registered to a view of the driving scene of the vehicle upon the display.

According one embodiment, graphic projection display 250 can include HUD 150, presenting information to the user in the context of the view through the HUD. The HUD is a transparent windscreen with small luminescent particles or structures embedded within the windscreen. As a result, the user can still see through the windscreen, for example, observing another vehicle in traffic in front of the user's vehicle. When the laser excitation light is projected upon the windscreen, the luminescent particles or structures emit visible light back to the user. However, this emitted light does not interfere with the user seeing through the windscreen. For example, the user can still see the vehicle in front of the user's vehicle, and the EVS system manager can direct a graphic including a box to be drawn upon a location of the windscreen and of a correct size such that the user sees a dynamically registered box drawn around the vehicle in front of the user's vehicle. As a result, HUD 150 can act as graphic projection display 250, projecting graphics superimposed upon or corresponding to a view of the driving scene of the vehicle.

Figure 3:
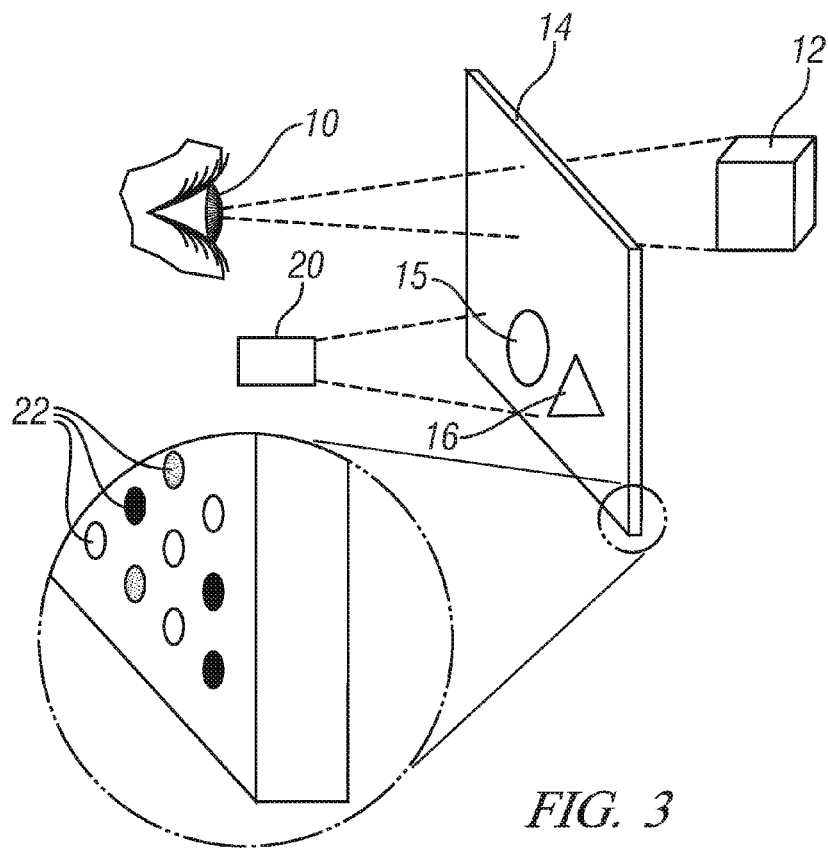
FIG. 3 illustrates a substantially transparent display, in accordance with the present disclosure.

FIG. 3 illustrates a substantially transparent display. Viewer 10 is able to see an arbitrary object (e.g. cube 12) through substrate 14. Substrate 14 may be transparent or substantially transparent. While viewer 10 sees arbitrary object 12 through substrate 14, the viewer can also see images (e.g. circle 15 and triangle 16) that are created at substrate 14. Substrate 14 may be part of a vehicle windshield, a glass substrate, a plastic substrate, a polymer substrate, or other transparent (or substantially transparent) medium that would be appreciated by one of ordinary skill in the art. Other substrates may complement substrate 14 to provide for tinting, substrate protection, light filtering (e.g. filtering external ultraviolet light), and other functions.

FIG. 3 illustrates illumination of substrate 14 illuminated with excitation light (e.g. ultraviolet light or infrared light) from light sources (e.g. a projector or laser), represented by device 20. The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

In one embodiment, the excitation light is output by device 20 including a projector. The projector may be a digital projector. The projector may be a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum. The projector may be a liquid crystal display (LCD) projector. The projector may be a liquid crystal on silicon (LCOS) projector. The projector may be an analog projector (e.g. a slide film projector or a movie film projector). One of ordinary skill in the art would appreciate other types of projectors which may be used to project ultraviolet light on substrate 14.

In another embodiment, an excitation light is output from device 20, including a laser. The intensity and/or movement of a laser beam output from device 20 may be modulated to create an image in substrate 14. In down-conversion embodiments, the output from the laser may be ultraviolet light. In up-conversion embodiments, the output from the laser may be infrared light.

FIG. 3 illustrates light emitting material (e.g. light emitting particles 22) dispersed in a substantially transparent substrate. When excitation light is absorbed by the light emitting particles 22, the light emitting particles emit visible light. Accordingly, in down-conversion embodiments, when ultraviolet light is absorbed by light emitting particles 22, visible light is emitted from the light emitting particles. Likewise, in up-conversion embodiments, when infrared light is absorbed by light emitting particles 22, visible light is emitted from the light emitting particles.

FIG. 3 illustrates light emitting material, including light emitting particles 22, dispersed in a substantially transparent substrate. These light emitting particles 22 can be substantially similar particles throughout, or, as illustrated in FIG. 3 the particles can vary in composition. When excitation light is absorbed by the light emitting particles 22, the particles emit visible light. Accordingly, in down-conversion embodiments, when ultraviolet light is absorbed by light emitting particles, visible light is emitted from the light emitting particles. Likewise, in up-conversion embodiments, when infrared light is absorbed by light emitting materials, visible light is emitted from the light emitting particles. Each light emitting particle may be a different type of light emitting material, which emits a different range of wavelengths of visible light in response to a different range of wavelengths of excitation light (e.g. ultraviolet or infrared light).

Light emitting particles 22 may be dispersed throughout substrate 14. In the alternative, as illustrated in FIG. 3, the particles may be disposed on a surface of substrate 14. Light emitting particles 22 may be integrated into substrate 14 by being coated on substrate 14. Light emitting material may be fluorescent material, which emits visible light in response to absorption of electromagnetic radiation (e.g. visible light, ultraviolet light, or infrared light) that is a different wavelength than the emitted visible light. The size of the particles may be smaller than the wavelength of visible light, which may reduce or eliminate visible light scattering by the particles. Examples of particles that are smaller than the wavelength of visible light are nanoparticles or molecules. each of the light emitting particles may have a diameter that is less than about 400 nanometers. According to embodiments, each of the light emitting particles may have a diameter that is less than about 300 nanometers, less than about 200 nanometers, less than about 100 nanometers, or less than about 50 nanometers. The light emitting particles may be individual molecules.

According to another embodiment of graphic projection display 250, a display screen can be utilized to present information to the user in the context of the view. An exemplary HMI device 151 includes a display associated therewith for receiving a projected image of a view corresponding to the view of a driving scene of the vehicle and displaying information for the user superimposed or coordinated with the view. HMI 151 includes a computing device where the operator of the vehicle can input commands to control various systems of the vehicle in signal communication with the HMI 151 and receive desirable information. For instance, utilizing the HMI 151, the user can provide input based upon the scene viewable through or on the display. Methods of projection upon HMI displays are known in the art and this disclosure is not meant to be limited to any one method of projection. HMI 151 can act as graphic projection display 250, projecting graphics superimposed upon or corresponding to a view of the driving scene of the vehicle.

According to another embodiment of graphic projection display 250, a touch screen device 260 can be utilized. Touch screen devices are well known in the art and will not be discussed in detail herein. Touch screen device 260 can act as graphic projection display 250, projecting graphics superimposed upon or corresponding to a view of the driving scene of the vehicle.

According to another embodiment of graphic projection display 250, the graphic projection display can include the non-transparent components 280 for receiving a projected image of a view corresponding to the driving scene of the vehicle and displaying a graphic superimposed upon or corresponding to the view. The non-transparent components 250 can include a dashboard, seats, headrests, structural pillars, roofs, sun visors and steering wheels. The non-transparent components 250 can include a transparent phosphor film reactive to display graphics in response to an excitation projector. Methods of projection are discussed above with reference to the substantially transparent windscreen HUD 150 and will not be discussed with reference to the non-transparent component 280. Co-pending U.S. application Ser. No. 12/563,407 is incorporated herein by reference and discloses projecting images and graphics upon non-transparent components. In alternative embodiments, the non-transparent component 250 can include the pixelated field of view limited architecture, discussed below with reference to FIGS. 7 and 8, when discussing the projection of dynamically registered graphics upon the HUD 150 and alternatively the non-transparent components 280.

Methods to display information to a user of a vehicle through graphic projection display 250 can provide the user with details regarding the operating environment of the vehicle and the operation of the vehicle. For example, graphic projection display 250 can represent navigational details to the user regarding a planned route. If the vehicle is on a highway and the planned route includes the vehicle utilizing an upcoming off-ramp, a graphic can be displayed upon graphic projection display 250 highlighting signs for the off-ramp, highlighting lane markers for the off-ramp, prompting lane changes to prepare to use the off-ramp, utilizing a graphic such as an arrow indicator registered to the surface of the off-ramp to indicate to the user where to drive. In another example, if information from a wireless connection to the internet includes heavy or stopped traffic along a planned route, a plurality of options can be displayed, for example, including textual information, highlighted signs, and an inset map in the graphic projection display 250. In another example, the user can initiate an inquiry regarding potential points of interest, for example, including gas stations, restaurants, shopping locations, or other similar destinations. When the vehicle gets within a certain distance, information regarding such points including prices, reviews or ratings by other consumers from commercial sites (displaying, for example, an average stars given out of five), registered graphics representing the location or where the parking lot is located, or other information can be displayed. In another example, details regarding operation of the vehicle can be displayed, for example, information regarding operation at a current speed including time until a planned destination is reached and fuel mileage and estimated optimal operation at another speed for improved fuel mileage. A number of embodiments of information that can be displayed are envisioned, and the disclosure is not intended to be limited to the particular exemplary embodiments described herein.

In addition to information regarding a route that the vehicle can take or operational information of the vehicle being driven by the user, information regarding a number of autonomous or semi-autonomous methods to operate a vehicle can be displayed upon graphic projection display 250. Exemplary autonomous or semi-autonomous methods utilize sensor inputs to control speed and/or steering of the vehicle. Methods include adaptive cruise control, lane keeping, lane change, and collision preparation and avoidance. Exemplary autonomous and semi-autonomous methods are disclosed in detail in above referenced U.S. application Ser. No. 12/417, 077. Information regarding operation of autonomous and semi-autonomous methods can be displayed, for example, a current following distance or a desired following distance the vehicle is attempting to achieve; highlighting lanes of travel currently being followed including a metric representing how close to the center of the current lane the vehicle is; indicating to the user an upcoming lane change; and threat assessments representing relative positions and trajectories of surrounding vehicle, pedestrians, and other objects. A number of autonomous and semi-autonomous methods to control a vehicle are envisioned, as well as related information that can be communicated to a user or occupants of a vehicle, and the disclosure is not intended to be limited to the particular exemplary embodiments disclosed herein.

Various types of information can be represented for a user of a vehicle upon graphic projection display 250. Much of the information that can be represented includes options or can include a prompt for input from the user. For example, a user can change priorities or desire to change a planned route of travel while en route to a planned destination. Known methods to change a route include the user focusing upon a map display or entering textual information in a field. Such methods require the user to take focus off of the view of the driving scene of the vehicle, for example, paying less attention to other vehicles close to the user's vehicle. Further, such information disconnected from the driving scene can be difficult to interpret quickly. A method monitoring a user input through the graphic projection display 250 and determining a control command based upon the user input can permit the user to provide the input while maintaining focus upon the driving scene and with improved context to the driving scene.

The EVS system manager 110 includes a programmable processor including programming to monitor a user input indicated to a portion of the graphic projection display 250 (see FIG. 2) and determine a graphic representing operational characteristics based on the monitored user input. It will become apparent that the graphics displayed upon the display can be utilized to provide control inputs to the display, to the vehicle control systems, or to another associated system.

Figure 4:
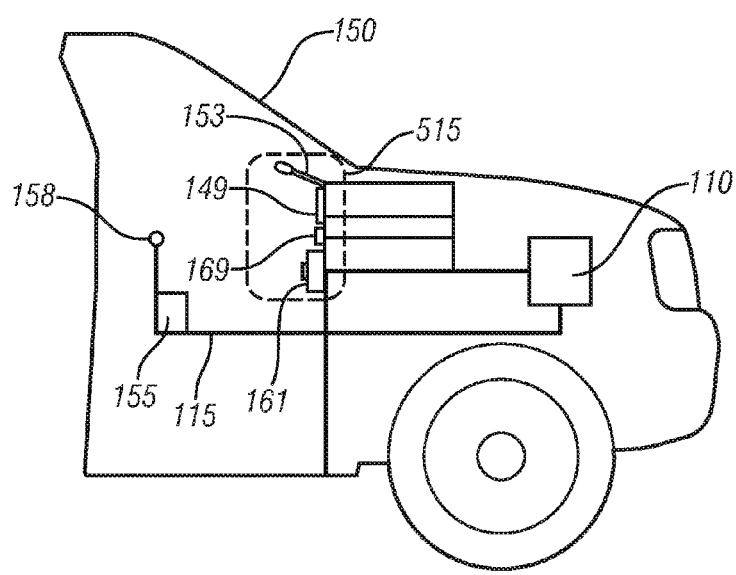
FIG. 4 illustrates an exemplary user input module for receiving user inputs indicated to a portion of the graphic projection display, in accordance with the present disclosure.

Referring to FIG. 4, an exemplary user input module (UIM) 515 for receiving user inputs indicated to a portion of the graphic projection display 250 is illustrated. The user inputs are monitored by the EVS system manager 110 and may be utilized for displaying graphics upon the graphic projection display 250 corresponding to the driving scene. The UIM 515 includes embodiments of user input devices and modules, and that the exemplary vehicle may only include one of the input devices and modules included within the UIM 515 for receiving and monitoring a user input indicated to a portion of the graphic projection display 250. However, embodiments are envisioned where the vehicle can include variations of the user input devices and modules included within the UIM 515 and selected ones can be enabled based on a vehicle user's preference. Exemplary UIM 515 includes an imaging device 161, a touch screen input module (TSIM) 149, a controller device 153 and a keyboard device 161.

TSIM 149 can be configured to receive touch gestures of a hand or finger of the user upon the module and indicated to a portion of the graphic projection display corresponding to the driving scene. The TSIM 149 can additionally include a display corresponding to the driving scene of the vehicle and configured to dynamically register graphics thereon. As will become apparent, the received touch gestures of the hand of the user provides a touch-based user interface for determining selection of options through the display.

Various devices are known in the art that can receive touch gestures of a hand or finger of a user. The TSIM 149 can be a touch screen device including a display screen which can identify the occurrence, location and position of a touch inside a region of the display. According to one embodiment, the display can include a view of the driving scene of the vehicle. According to another embodiment, for example when providing alternative options for selection, the display can include selected images for selection. For example, providing a navigational choice, the display could show one half of the screen with a textual message, for example, providing an option to maintain a currently selected route, and the other half of the screen with a segment of the view of the driving scene including a sign showing a street name or exit number providing the user with an option to select the displayed street sign to alter the planned navigational route. The TSIM 149 can be integrated within the HMI device 151 (see FIG. 2). The TSIM 149 can be embodied as a handheld device such as a personal digital assistant (PDA) or a cell phone, all having displays including the driving scene of the vehicle. The TSIM 149 facilitates a user to interact with what is displayed on the display (i.e., the driving scene), rather than indirectly with a mouse or touchpad and it lets the user perform the touch gestures without necessitating such intermediary devices. Such methods to display options for selection can include graphical prompts such as an icon or flashing box indicator around a displayed item, audio prompts, or a number of other features known in the art to quickly convey to the user information to facilitate the selection of options being presented.

Furthermore, various methods are known in the art for monitoring and receiving touch gestures of the hand or finger of the user. In a non-limiting embodiment, the TSIM 149 can be a resistive touch screen display composed of standard glass sheet that is coated with a thin conductive and a resistive metallic sheet, wherein an electrical current travels between the two layers and monitors the touch gesture when the two layers contact each other in the same location and thereby interrupting the electrical current. In another non-limiting embodiment, the TSIM 149 can be a surface wave touch screen display utilizing ultrasonic waves to process user inputs from the screen. In this embodiment, the surface wave touch screen display utilizes a transducer identifying if a signal has been altered by a touch at any movement, where ultrasonic waves flow over the entire screen when the user touches the display at a specific location. In yet another non-limiting embodiment, the TSIM 149 can be a capacitive touch screen display composed of an indium tin oxide sheet that stores electrical charge and is positioned on a glass layer of the display. When the hand or finger of the user input contacts the display, a small quantity of the charge is transmitted to the hand or finger of the user and the quantity of charge on the capacitive sheet reduces. A processor associated therewith computes the comparative variation and determines the precise location where the touch-gesture took place, the location corresponding to the location on the driving scene of the vehicle. In yet another non-limiting embodiment, the TSIM 149 can include infrared touch screen displays. Infrared touch screen displays can react to infrared or thermal waves (i.e., heat). Infrared touch screen displays can further utilize vertical and horizontal infrared sensors around the perimeter to create a grid, and thus pinpoint the exact location where the display screen has been touched by the hand or finger of the user.

It should be appreciated that the TSIM 149 is not to be limited to any of the devices and methods discussed above and that the TSIM 149 only be capable of receiving touch gestures of a hand or finger of the user upon the module 149 and indicated to a portion of the graphic projection display 250 corresponding to the driving scene. The controller device 153 can include a mechanism, such as a joystick, mouse, lever, stylus, touch pad or other accessory for receiving user manipulations indicated to a portion of the graphic projection display 250.

The imaging device 161 can include capturing images of the hand of the user and utilizing software associated therewith to monitor the location and orientation of the hand of the user to provide an optical image. The images can be captured utilizing infrared and/or ultraviolet technology. The optical image can be processed to generate three-dimensional (3D) mapping of the hand movement of the user. As will become apparent, the optical image of the hand movement provides a gesture-based user interface. Therefore, user hand movements (i.e., gesturing) detected by the imaging device 161 can be used in place of tactile interface elements such as a mouse, lever, joystick, knob or other accessory. According to one exemplary embodiment, the imaging device 161 requires capturing a sequence of images, wherein the location and the orientation of the hand of the user is monitored for each image to provide the optical image of the hand movement of the user. The software associated with the imaging device 161 can be integrated within the imaging device 161 and in signal communication with the EVS system manager 110 by suitable dedicated circuitry. Additionally, the software associated with the imaging device 161 can be integrated within the EVS system manager 110.

Various methods are known in the art that use imaging devices to process optical images based on the monitored location and orientation of an object (i.e., a hand) to generate 3D mapping of the object. PCT International Publication WO 2007/043036, which is incorporated herein by reference, discloses a method and system based on projecting a laser speckle pattern onto an object, and then analyzing an image of the pattern on the object. U.S. Pat. No. 6,100,517, which is incorporated herein by reference, discloses a method of using pulsed modulation in order to measure time of flight of light from an object to a detector, where a camera creates an image indicating distances to points in objects in a scene. U.S. Publication No. 2010/0020078 A1, which is incorporated herein by reference, discloses a method of illuminating an object with beams of radiation and generating intensity-based 3D mapping of the object. The present disclosure is not limited to any of the methods discussed above, and can include any device capable of monitoring a hand movement to provide a gesture-based input.

As an alternative or additional source of inputs, the keyboard device 169 can receive user keystrokes to the keyboard device indicated to a portion of the graphic projection display 250. The keyboard device 169 can be used in association with other devices such as the controller device having a joystick or the HMI. Keyboard devices can include alpha-numeric inputs, for example, including a miniaturized keyboard utilized with a computer or cell phone device. In another embodiment, the keyboard can include a select number of keys, for example, with five buttons labeled by letters A through E or by different color keys. Displays offered for selection could include icons matching the labels of keys on the keyboard device 169. As will become apparent, the received user keystrokes to the keyboard device 169 provides a key-based interface.

HMI device 151 can be utilized to receive user inputs. Methods are known to sense a touch to an area of HMI device 151. Alternatively, buttons can be used associated with the HMI device 151 and graphically cued to selections that are presented upon the HMI device.

Figure 5:
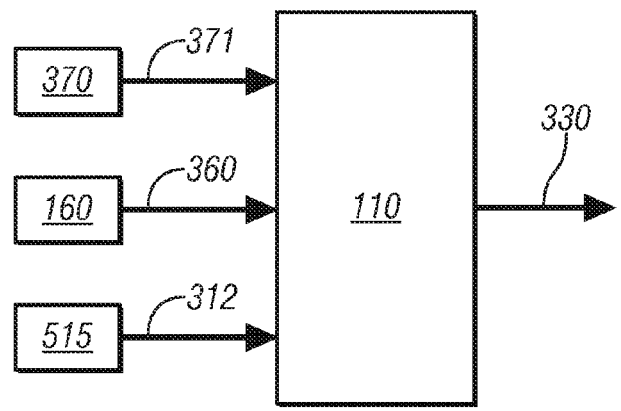
FIG. 5 illustrates an exemplary information flow for dynamically registering a graphic on a driving scene utilizing the graphic projection display, including an EVS system manager monitoring inputs to generate display requirements, in accordance with the present disclosure.

FIG. 5 illustrates an exemplary information flow for dynamically registering a graphic on a driving scene utilizing the graphic projection display 250 including an EVS system manager 110 monitoring inputs 360 from the occupant eye location sensing system 160, inputs 371 from a vehicle location and orientation module 370, and inputs 312 from the UIM 515 to thereby generate display requirements 330. By monitoring and combining information from various sources such as inputs 371, 360, and 312, EVS system manager 110 can operate a method or methods to create dynamically registered information regarding the operation of the vehicle and its operating environment upon a display device or windscreen HUD device including operator input to the graphic display.

With reference to FIGS. 1 and 5, the occupant eye location sensing system 160 includes sensors known in the art to approximate a location of the head of an occupant and further the orientation or gaze location of the eyes of the occupant. An occupant can be an operator or user of the vehicle or a passenger within the vehicle. Head and eye sensing devices are known in the art and will not be discussed in great detail herein. For the purposes of this disclosure, a camera based device is utilized in combination with image recognition software to estimate a three-dimensional head location within the vehicle, able to be coordinated with a vehicle coordinate system, and a direction of occupant's gaze based upon image recognition programming. An eye location input 360 is input to the EVS system manager 110.

The UIM 515 can be configured to monitor the user input location indicated to a portion of graphic projection display corresponding to the driving scene. A location of a view of an object through the HUD device can be calculated. Such a method, determining a location of a view of an object upon a HUD device based upon a location of the object and the eye location of the operator/user, is disclosed in co-pending U.S. application Ser. No. 12/726,444, which is incorporated herein by reference. The user input location refers to the location upon the display or HUD device to which the gesture of the user is directed. In some embodiments, the location of the display corresponding to a user input location can include text or a graphic indicating a selection that can be made. In some embodiments, an object visible through the HUD device defines the location or portion of the HUD device corresponding to a user input location that can be pointed to indicate selection of the object. For example, if a potential destination is visible through a center-left portion of the HUD device, a user hand gesture, based upon the eye location of the user relative to the HUD device and a determined location of the view of potential destination upon the HUD device, pointing to the center-left portion of the HUD device can be interpreted as a user input location corresponding to the potential destination. In another exemplary embodiment, a user input location can be determined by gaze location, for example, with an exemplary selector button on a steering wheel permitting the user to indicate selection to a portion of the display based upon the user's gaze location when the selector button is depressed. By determining, based upon the location of the user, where a hand gesture is indicated to upon HUD device, a user input location 312 is input to the EVS system manager 110 can be generated and used as a control input.

Returning to FIG. 5, according to one exemplary embodiment, the EVS system manager 110 monitors the eye location input 360, the vehicle location and orientation input 371 and the user input location 312 to thereby generate the display requirements 330 for dynamically registering the graphic upon the graphic projection display. If the graphic includes an object or portion of a view in the operating environment of the vehicle, then the EVS system manager 110 will additionally require the sensor data representing the object or view. It is appreciated that if the graphic includes a feedback graphic representing, for example, a gaze location, gesture, or selection control feedback, it may only be necessary to monitor the eye location input 360 and the user input location 371 to generate the display requirements 330 for dynamically registering the feedback graphic upon the graphic projection display 250.

Figure 6:
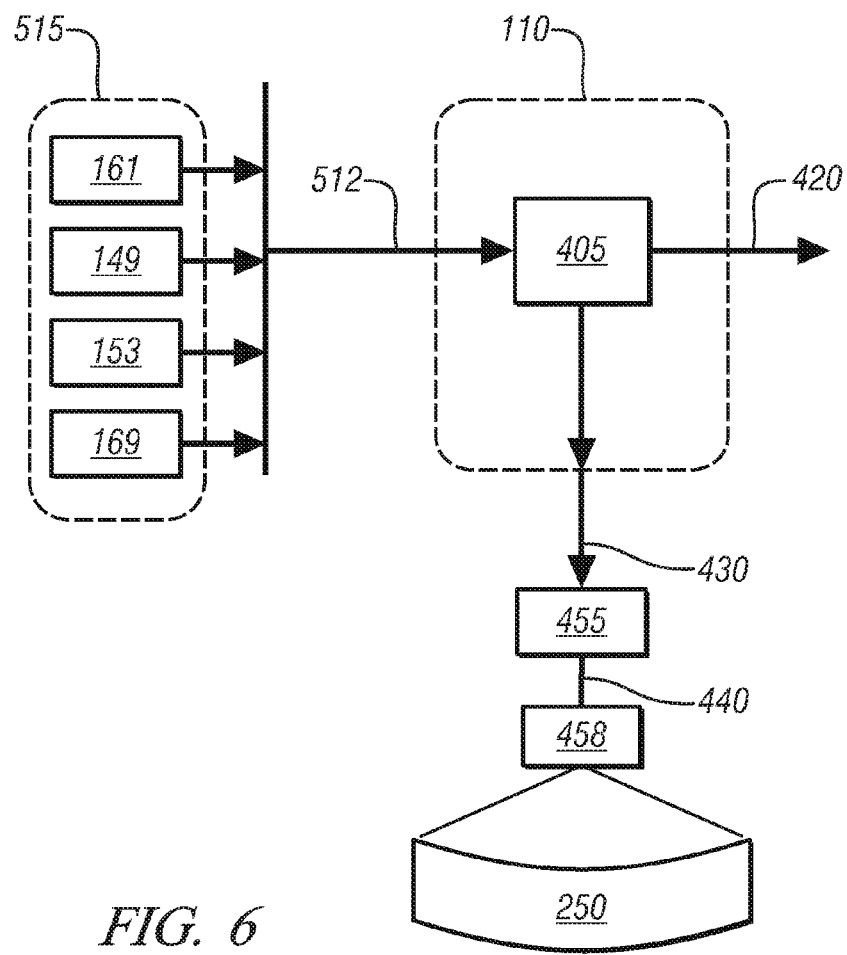
FIG. 6 illustrates an exemplary information flow to determine a graphic based upon inputs to an EVS system manager, in accordance with the present disclosure.

FIG. 6 illustrates an exemplary information flow to determine a graphic based upon inputs to EVS system manager 110. The illustrated process includes an EVS system manager 110 monitoring information from various sources and generating display requirements 430, graphics module 455 monitoring the display requirements 430 from the EVS system manager and generating graphics commands 440, and a graphics projection display 250, for example, including the exemplary display embodiments disclosed herein. The EVS system manager 110 includes a command selection module 405, integrating user input 512 with other information available to the EVS system manager to provide any graphics required for command selection including selection prompts and feedback through display requirements 430 and output vehicle commands representing selections made by the user as command signal 420. User input 512 can include user input location 312 or any other inputs that can convey a command selection or a desire to make a command selection. Exemplary UIM 515 is depicted including imaging device 161, TSIM 149, controller device 153, and keyboard device 169.

Exemplary operation of command selection module 405 can include a number of embodiments. According to one exemplary embodiment, inputs from a navigation module provide to module 405 a present planned route. An input from vehicle sensors, a wireless connection, or other input source can indicate to the navigation module that the road along the planned route is congested. The navigation module plots alternative routes, and two alternative proposed routes are provided to module 405. Module 405 combines the data from the navigational module with visual data from camera sensors and determines graphics that can best represent the options that need to be represented to the user for selection. In an exemplary condition, wherein three options include 1) taking the next right turn, 2) taking a second right turn, and 3) staying on the present route despite the congestion, the module may determine to represent option 1) upon a right most third of the graphic projection display 250 including a graphic representing a sharp right turn, option 2) upon a center third of the graphic projection display 250 including a graphic representing a right turn with less severity than represented for option 1), and option 3) upon a left most third of the graphic projection display 250 including a graphic representing a straight arrow pointing ahead. Text representing the congested condition ahead and representing each of the options can be displayed. Input from the user can be monitored and input to module 405. Feedback to the user input can be determined by module 405 and displayed upon the graphic projection display 250. Once a selection by the user is made, the updated navigation route or impending navigational maneuvers can be represented upon the graphic projection display 250. Operation of module 405 is a non-limiting example, and a number of other exemplary operations of the module can similarly be expressed.

Figure 7:
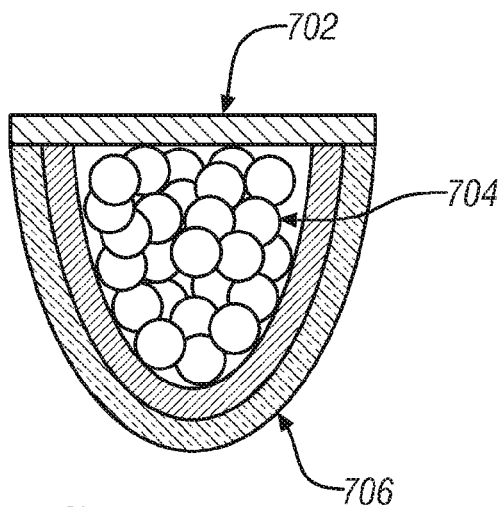
FIG. 7 illustrates an exemplary emitter, capable of emitting light to a limited field of view, in accordance with the present disclosure.
Figure 8:
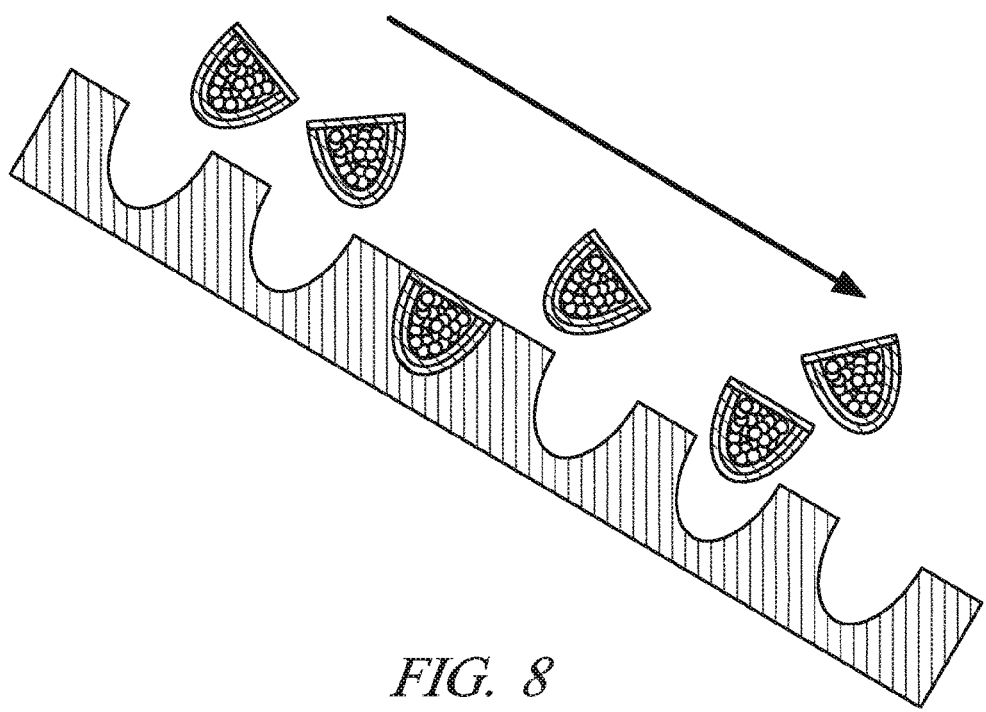
FIG. 8 illustrates an exemplary process to create the necessary structure of emitters aligned to a polymer substrate in order to enable limited field of view viewing, in accordance with the present disclosure.

Pixelated field of view limited architecture enables representation of graphics to one occupant of the vehicle without displaying the graphics to another occupant. An exemplary embodiment of a pixelated field of view limited architecture enabling image view from a limited direction includes use of microstructures or an arrangement of particles accepting an excitation light and emitting light in a limited direction. Co-pending U.S. application Ser. No. 12/564,899, which is incorporated herein by reference discloses a pixelated field of view limited architecture. FIGS. 7 and 8 illustrate an exemplary use of a pixelated field of view limited architecture. FIG. 7 illustrates an exemplary emitter, capable of emitting light to a limited field of view. The exemplary emitter includes a UV transparent encapsulant 702, for example, made from $SiO_2$, filled with an LIF material 704 that fluoresces visible wavelengths when irradiated with ultraviolet radiation, with a parabola shaped narrow band multilayer reflection structure 706. In this exemplary embodiment, a thin film of these emitters is deposited as onto a polymer. In preparation for the film, impressions in the shape of parabolas similar to the shape formed in the emitters are embossed into the polymer material. The emitters are deposited by chemical vapor deposition onto the polymer substrate, filling the parabola impressions with emitters. FIG. 8 illustrates an exemplary process to create the necessary structure of emitters aligned to a polymer substrate in order to enable limited field of view viewing. By an exemplary process such as etching, free standing parabolas that are filled with emitting material are created by releasing them from the substrate. The removal from the polymer substrate can be also be accomplished by dissolving the plastic substrate with a suitable solvent. The free standing parabolas are then nested into divots that have been created in the glass substrate by photolithographic methods or embossing. The method of mating the parabola to the divot can be accomplished by a process such as fluidic self assembly, similar to that practiced by Alien Technology, wherein the parabolas are flowed over the substrate and parabola-divot mating occurs in a statistical fashion.

Based upon the methods discussed above including the method for dynamically registering a graphic discussed in FIG. 5, a dynamically registered graphic can be projected upon a graphic projection display 250 embodied in a substantially transparent windscreen head-up display 150 including a pixelated field of view limited architecture, with the graphics corresponding to the driving scene of the vehicle. The pixelated field of view enables graphic view from a limited direction (e.g., first limited direction and/or second limited direction). The dynamically registered graphic can include a first dynamically registered graphic based on a first viewer location and a second dynamically registered graphic based on a second viewer location. It is understood that both of the first and second dynamically registered graphics can be projected upon the substantially transparent windscreen HUD. Further, the first dynamically registered graphic based upon the first viewer location is further based upon utilizing the pixelated field of view enabling view of the graphic from a first limited direction oriented toward the first viewer location. It will be understood that the first viewer location can correspond to the driver of the vehicle. Likewise, the second dynamically registered graphic based upon the second viewer location is further based upon utilizing the pixelated field of view enabling view of the graphic from a second limited direction oriented toward the second viewer location. It will be understood that the second viewer location can correspond to one of the passenger seats in the vehicle. Likewise, the method of dynamic registration discussed in FIG. 5 can further include monitoring data related to a second viewer eye location, wherein the second viewer eye location corresponds to one of the passengers at the second viewer location. It is understood that monitoring an occupant eye location can include monitoring data related to a first viewer eye location and/or the second viewer eye location.

The method of pixelated field of view limited architecture as discussed above is applied to the substantially transparent windscreen HUD 150. However, this method can additionally be applied to the non-transparent components 280. For instance, a section of the instrument panel or of the support pillars could include a pixelated field of view limited architecture such that graphics could be represented to the user/operator of the vehicle and not to a passenger in the other front seat of the vehicle.

The above methods represent ways in which user input can be used to select commands to the vehicle. For example, methods include interpreting user gestures made to the windscreen as commands. A number of methods can be used to present selectable commands to the user, and a number of methods can be used to interpret user inputs as desired commands. A textual representation or graphic representation can be projected upon the graphic projection display 250 indicating a selection that can be made to that text or graphic. In such an example, a user indication to the area or the text or graphic, based upon a registered location of the text or graphic and a determined intersection between the eyes of the user, the graphic and the location of the gesture by the user, can be used to determine the desired input buy the user. Such a monitored gesture can be directly input as a command. In another exemplary embodiment, such a monitored gesture can create a prompt to the user, for example, representing a proposed command and requiring confirmation by the user to generate an actual command based upon the proposed command. Such a confirmation can include a gesture to a confirming graphic; a button located, for example, on the steering wheel of the vehicle; or a verbal command. A gesture can be used to select commands presented to the user. In addition or alternatively, user gestures can prompt the system to react. For example, if a user points to an object visible upon the graphic projection display 250, the system can provide information about the object or determine whether appropriate command options can be presented to the user related to the object. For example, if the user points to a parking garage entrance, the user can be shown a prompt representing parking rates for the structure and/or a prompt asking if the vehicle should be commanded to enter the parking garage. A number of embodiments for presentation and selection of options through user gestures are envisioned, and the disclosure is not intended to be limited to the particular examples provided herein.

The above methods can be incorporated within an EVS system manager. Such an EVS system manager can exist within a single control module or physical device or can alternatively be spanned across a number of modules or physical devices. The EVS system manager can take a number of different embodiments, and the disclosure is not intended to be limited to the particular exemplary embodiments of the EVS system manager disclosed herein. Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 9:
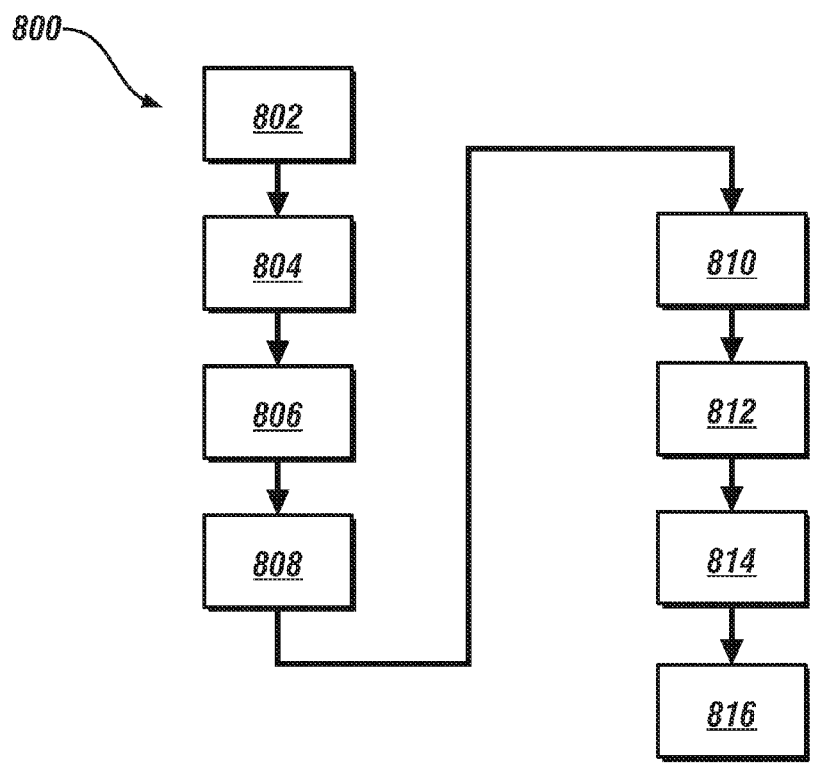
FIG. 9 illustrates an exemplary process to operate the methods disclosed herein, in accordance with the present disclosure.

FIG. 9 illustrates an exemplary process 800 to operate the methods disclosed herein. Exemplary steps to process 800 are represented in the following table.

TABLE 1

| Step | Description |
| --- | --- |
| 802 | Monitor a Command Selection to Be Presented |
| 804 | Monitor a View in Front of the Vehicle |
| 806 | Monitor an Eye Location of a User of the Vehicle |
| 808 | Determine a Registered Graphic Describing the Command Selection to Be Projected |
| 810 | Project the Registered Graphic |
| 812 | Monitor User Input to a Location of the Display |
| 814 | Determine an Activation of the Command Selection Based upon the Monitored User Input |
| 816 | Control the Vehicle based upon the Activation of the Command Selection |

Process 800 starts at step 802 by monitoring a command selection to be presented to the user of the vehicle. Such a command selection can be prompted according to a number of exemplary embodiments. For example, when a navigation choice must be made (planned route includes a road now closed), the command selection is prompted by a lacking instruction by the user. According to another embodiment, the command selection can be prompted by a option identified by the EVS system manager reaching a threshold likelihood that the user could be interested in the identified option. For example, if the vehicle has a full gas tank, the user is unlikely to select an identified gas station in the view as a new destination. If, however, the gas tank of the vehicle is nearly empty, such a selection is more likely. A number of methods to determine such likelihoods and set the likelihood threshold or thresholds are known in the art. According to another exemplary embodiment, command selections can be prompted by the user. For example, if the user makes a gesture toward the display, the EVS system manager can be awakened to display a number of likely or configurable options that can be selected by the user. A number of methods to prompt and determine a content of command selections are envisioned, and the disclosure is not intended to be limited to the particular exemplary embodiments disclosed herein.

Step 804 monitors a view in front of the vehicle. Step 806 monitors an eye location of the user. The command selection of step 802 can be put into context of the view with a graphic registered to the view based upon the eye location of the user. Based upon the command selection, the monitored view and the monitored eye location of the user, step 808 determines an appropriate registered graphic or graphics to display upon the graphic projection display to convey the command selection available to the user. At step 810, the determined graphic is projected upon the graphic projection display. At step 812, a user input to a portion or location of the graphic projection display is monitored. in one embodiment employing hand gestures, the location of the hand of the user compared to the eyes of the user is utilized to determine which portion of the display the hand gestures are directed to based upon the perception of the user. At step 814, the user input is interpreted to selectively activate the command selection. At step 816, the activation of the command selection is utilized to control the vehicle. Process 800 is an exemplary, non-limiting embodiment to employ methods disclosed herein.

Figure 10:
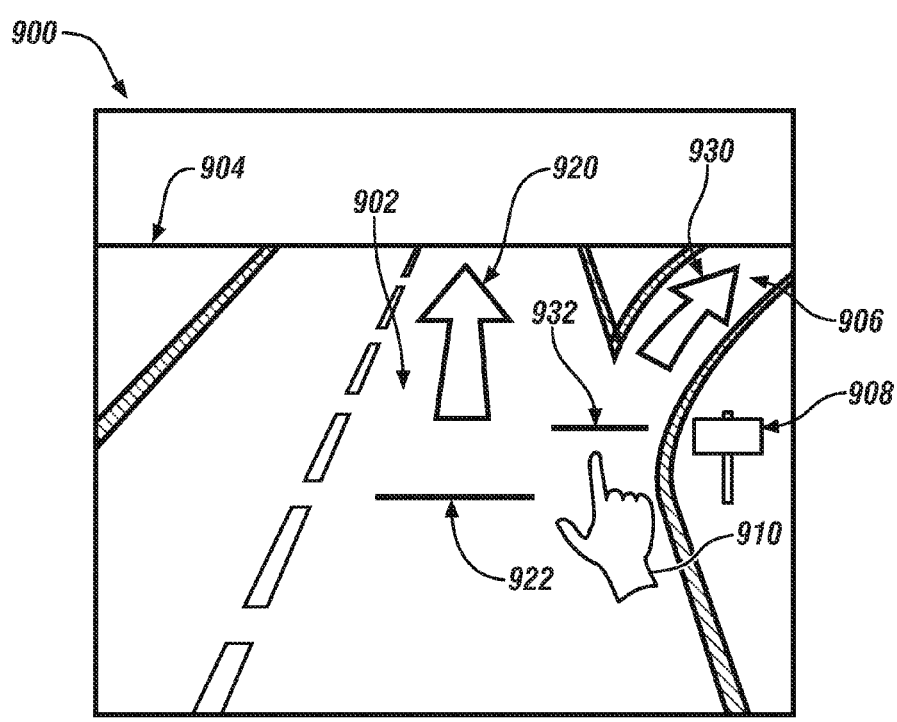
FIG. 10 illustrates an exemplary view through a transparent windscreen graphic projection display and user input to registered graphics upon the display, in accordance with the present disclosure.

FIG. 10 illustrates an exemplary view through a transparent windscreen graphic projection display 900 and user input to registered graphics upon the display. The view visible via display 900 can either be the actual view visible through a substantially transparent display or can be projected as part of the displayed graphics. Road surface 902 is depicted. Visible horizon 904 is also depicted. Exit ramp 906 and road sign 908 are depicted. Exemplary user pointing to the display 910 is depicted. Registered graphic 920 is depicted registered to a current lane of travel upon road surface 902. Text 922 accompanying graphic 920 can additionally be displayed. Similarly, registered graphic 930 to exit ramp 906 and optional accompanying text 932 are depicted registered to exit ramp 906. User pointing to the display 910 is monitored, and based upon the location of the input, selection of between options presented by graphics 920 and 930 can be determined.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control operation of a vehicle based upon a user input from a user of the vehicle to a graphic projection display representing a registered graphic to a view in front of the vehicle, the method comprising:
    monitoring, at an enhanced vision system (EVS) system manager, a user eye location;
    projecting, at a graphics system, the registered graphic to the view in front of the vehicle at a location upon the graphic projection display, comprising:
        monitoring, at the EVS system manager, a command selection to be presented to the user of the vehicle,
        monitoring, at the EVS system manager, the view in front of the vehicle,
        monitoring, at the EVS system manager, a location of an object or feature corresponding to the command selection using at least one of vehicle sensors and a wireless connection, the object or feature visible through a transparent windscreen of the vehicle in the view in front of the vehicle;
        determining, at EVS system manager, the registered graphic representing the command selection based upon the view in front of the vehicle, and the user eye location, wherein the location of the registered graphic projected upon the graphic projection display is indicated to the location of the object or feature visible through the transparent windscreen of the vehicle;
    monitoring, at the EVS system manager, an estimated user gaze location based on the monitored user eye location, the user gaze location corresponding to a point on the view in front of the vehicle where eyes of the user are currently focused;
    monitoring, at the EVS system manger, the user input to the graphic projection display, the user input comprising a hand gesture of the user,
    determining, at the EVS system manager, a portion of the graphic projection display at which the user input is indicated based upon the estimated user gaze location; and
    activating, at the EVS system manager, the command selection based on the portion of the graphic projection display at which the user input is indicated to include the location of the registered graphic upon the graphic projection display.

2. The method of claim 1, wherein the graphic projection display is a substantially full-windscreen transparent windscreen head-up display.

3. The method of claim 1, wherein the graphic projection display is a transparent windscreen head-up display.

4. The method of claim 1, wherein monitoring the command selection comprises monitoring a selection to be presented regarding a navigational route of the vehicle.

5. The method of claim 4, wherein monitoring the selection to be presented regarding the navigational route of the vehicle comprises:
    monitoring traffic along a planned route of the vehicle; and
    determining the selection be presented comprising an alternative route based upon the monitored traffic.

6. The method of claim 1, wherein monitoring the command selection comprises:
    monitoring a user input indicated to the object or feature in the view in front of the vehicle;
    retrieving information regarding the object or feature through the wireless connection; and
    determining the command selection to be presented based upon the user input indicated to the object or feature and the retrieved information.

7. The method of claim 1, further comprising operating the vehicle through one of an autonomous method to operate the vehicle and a semi-autonomous method to operate the vehicle; and
    wherein monitoring the command selection comprises:
        monitoring information regarding operating the vehicle through the one of the autonomous method to operate the vehicle and the semi-autonomous method to operate the vehicle;
        determining configurable options for operating the vehicle through the one of the autonomous method to operate the vehicle and the semi-autonomous method to operate the vehicle based upon the monitored information; and
        determining the command selection to be presented to the user of the vehicle based upon determined configurable options.

8. The method of claim 7, wherein operating the vehicle through the one of the autonomous method to operate the vehicle and the semi-autonomous method to operate the vehicle comprises operating the vehicle through one of an adaptive cruise control method, a lane keeping method, a lane change method, a collision preparation method, and a collision avoidance method.

9. The method of claim 3, wherein monitoring the user input to the graphic projection display comprises monitoring a hand gesture indicated to the graphic projection display.

10. The method of claim 9, wherein monitoring the hand gesture comprises utilizing an imaging device to generate three-dimensional mapping of the hand gesture; and
    determining the hand gesture to indicate to the registered graphic based upon the three-dimensional mapping of the hand gesture.

11. The method of claim 10, wherein utilizing the imaging device to generate three-dimensional mapping of the hand gesture comprises capturing images with a device utilizing one of infrared light, ultraviolet light, and a combination of infrared and ultraviolet light.

12. The method of claim 10, wherein utilizing the imaging device to generate three-dimensional mapping of the hand gesture comprises utilizing a laser speckle pattern.

13. The method of claim 10, wherein utilizing the imaging device to generate three-dimensional mapping of the hand gesture comprises utilizing pulsed modulation.

14. The method of claim 10, wherein utilizing the imaging device to generate three-dimensional mapping of the hand gesture comprises illuminating the hand gesture with beams of radiation and generating the three-dimensional mapping based upon intensity-based mapping.

15. The method of claim 1, wherein the graphic projection display comprises a touch screen device representing the view in front of the vehicle and the location of the registered graphic upon the touch screen device indicated to the location of the object or feature in the view.

16. The method of claim 1, wherein the graphic projection display comprises a human machine interface device representing the view in front of the vehicle and the location of the registered graphic upon the human machine interface indicated to the location of the object or feature in the view.

17. The method of claim 16, wherein the human machine interface device comprises a non-transparent surface comprising luminescent materials;
   wherein projecting the registered graphic to the view in front of the vehicle upon the graphic projection display comprises:
      projecting the view upon the graphic projection display;
      determining the registered graphic based upon the projected view; and
      projecting the registered graphic upon the graphic projection display.

18. The method of claim 1, wherein projecting the registered graphic comprises projecting the registered graphic upon a pixelated field of view limited architecture.

19. Apparatus to control operation of a vehicle based upon a user input from a user of the vehicle to a graphic projection display representing a registered graphic to a view in front of the vehicle, the apparatus comprising:
   the graphic projection display; and
   an enhanced vision system (EVS) system manager:
      monitoring a user eye location;
      monitoring an estimated user gaze location based on the user eye location, the user gaze location corresponding to a point on the view in front of the vehicle where eyes of the user are currently focused
      determining the registered graphic to be represented based upon the view in front of the vehicle, the registered graphic representing a command selection to be presented to the user of the vehicle, wherein determining the registered graphic comprises:
         monitoring a location of an object or feature corresponding to the command selection using at least one of vehicle sensors and a wireless connection, the object or feature visible through a transparent windscreen of the vehicle in the view in front of the vehicle;
         determining the registered graphic representing the command selection based upon the view in front of the vehicle and the user eye location, wherein the registered graphic is projected at a location upon the graphic projection display indicated to the location of the object or feature visible through the transparent windscreen of the vehicle;
      monitoring the user input to the graphic projection display, the user input comprising a hand gesture of the user;
      determining a portion of the graphic projection display at which the user input is indicated based upon the estimated user gaze location; and
   activating the command selection based on the portion of the graphic projection display at which the user input is indicated to include the location of the registered graphic upon the graphic projection display.

\* \* \* \* \*